July 9, 1968 W. T. A. RUNDLE 3,391,899
PIPE COUPLINGS

Filed March 7, 1966 2 Sheets-Sheet 1

INVENTOR:-
WILLIAM THOMAS ALAN RUNDLE

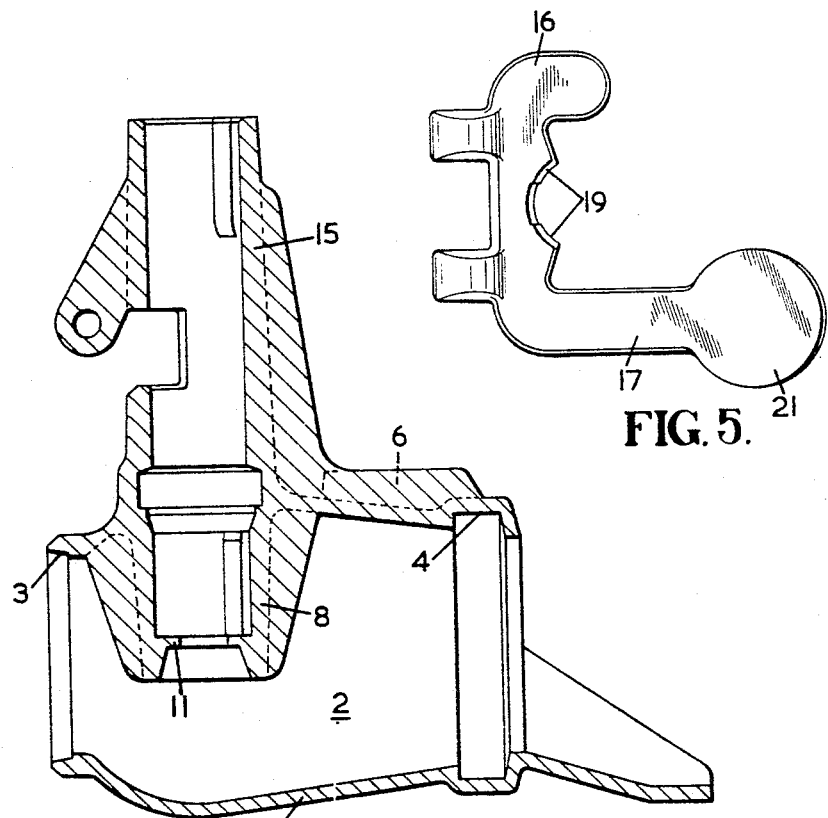
FIG. 5.
FIG. 3.
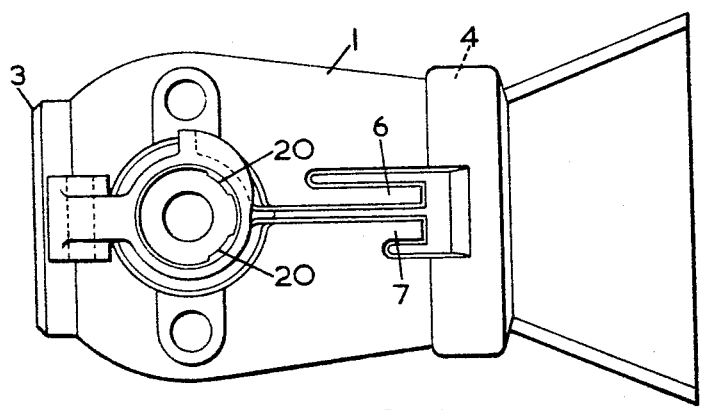
FIG. 4.
INVENTOR:-
WILLIAM THOMAS ALAN
RUNDLE
BY:- Mackenney & Mackenney
ATTORNEY

# United States Patent Office 3,391,899
Patented July 9, 1968

3,391,899
PIPE COUPLINGS
William Thomas Alan Rundle, Crowe, Ringwood, England, assignor to Wright Rain Limited, Crowe, Ringwood, England
Filed Mar. 7, 1966, Ser. No. 532,130
Claims priority, application Great Britain, Mar. 13, 1968, 10,726/65
1 Claim. (Cl. 251—149.6)

ABSTRACT OF THE DISCLOSURE

A coupling for connecting a standpipe to a pipe-line. The coupling has inlet and outlet connections enabling it to be connected in the pipe-line and also has an upwardly-facing socket for receiving the lower end of the standpipe. The coupling carries a lever in the form of a pedal and is biased by a spring into a position in which it engages the circumferential surface of a standpipe inserted into the socket and urges the latter into engagement with a diametrically-opposite part of the inner wall of the socket. To release the standpipe or to insert the standpipe into the socket, the operator depresses the pedal with his foot, thereby to leave both his hands free to hold the standpipe. Insertion of the standpipe into the socket opens a valve therein to permit water in the pipe-line to flow through the coupling into the standpipe.

The invention relates to a coupling for holding a pipe in a socket and is particularly, but not exclusively, concerned with a coupling for holding a standpipe in a socket communicating with an irrigation pipe-line.

An object of the invention is to provide a pipe coupling whereby a standpipe, e.g. for a sprinkler, can readily be connected to or disconnected from an irrigation pipe-line without the necessity of interrupting the flow through the pipe-line.

According to the invention, a coupling comprises a housing defining a socket for receiving an end of a pipe, a member pivotally mounted on the housing and movable between a first position in which the member will engage the outer cylindrical surface of a pipe which has been inserted into the socket, thereby to hold the pipe from axial withdrawal from the socket, and a second position in which the member is disengaged from the outer cylindrical surface of the pipe, spring means operable to bias said member into said first position and personally-operable means to move said member against the bias of the spring means into said second position.

Conveniently, said member and the personally-operable means are respectively integral portions of a lever pivotally mounted on the housing and engaged by the spring means. The lever portion constituting the personally-operable means may conveniently be a pedal which the operator can depress with a foot, thereby leaving both his hands free for inserting the pipe into or removing it from the socket.

The lever portion constituting said member may have a concave surface shaped to embrace part of the circumference of the pipe, thereby to urge the pipe laterally in the socket into engagement with a part of the inner peripheral surface thereof, whereby, when the member is in said first position, the pipe will be gripped between the concave surface of the member and said part of the inner peripheral surface of the socket.

Preferably the lever portion constituting said member has a pair of said concave surfaces spaced apart circumferentially of the pipe, thereby to embrace the pipe at a pair of circumferentially-spaced positions thereon, and the inner peripheral surface of the socket has a pair of inwardly extending arcuate extensions each arranged substantially diametrically opposite one of said concave surfaces on said member, whereby when the latter is in said first position, the pipe will be gripped between four circumferentially-spaced positions around its periphery.

Figure 1:
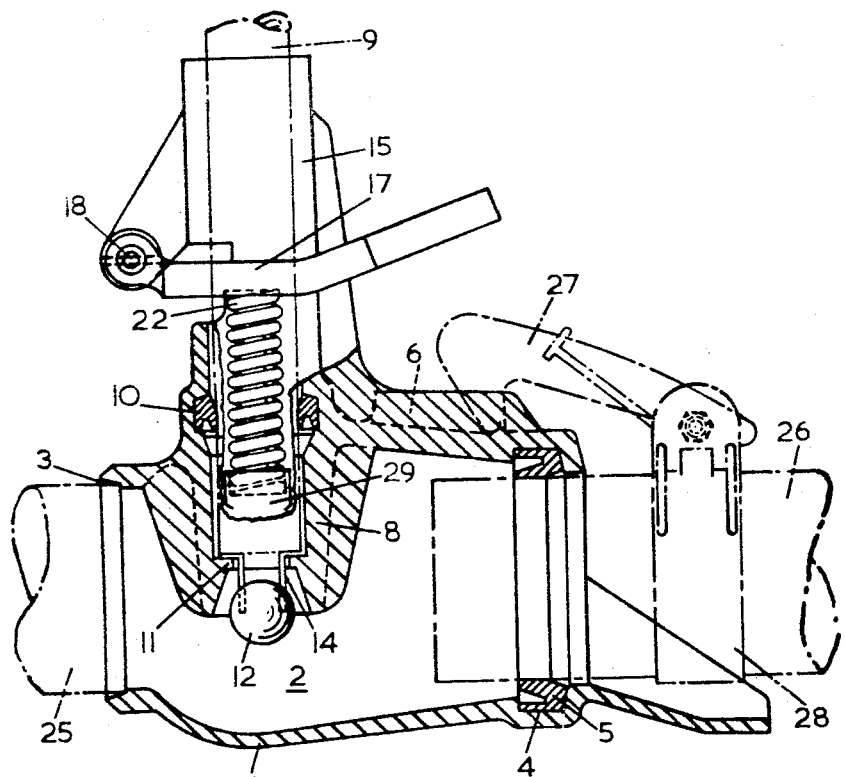
Figure 2:
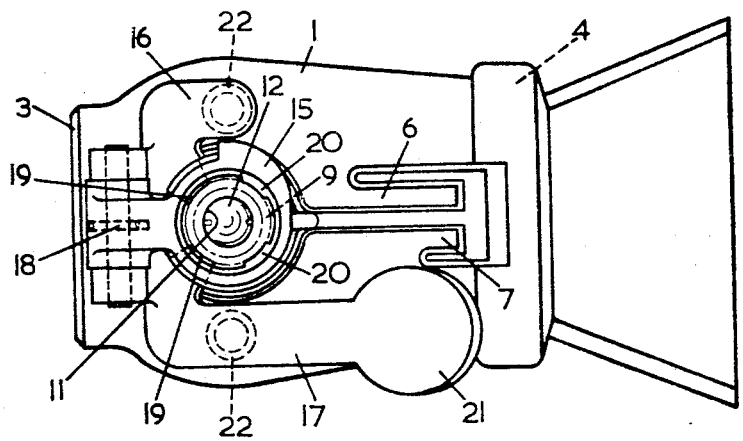

By way of example, one form of pipe coupling for securing a standpipe in a housing connected to a pipe-line will now be described with reference to the accompanying drawings, in which:

FIGURE 1 is an axial section through the housing and also shows an operating lever 17, a spring 22 engaging said lever, a valve member 12 and indicates in chain-dot lines the standpipe 9 and pipes 25 and 26 of said pipe-line;

FIGURE 2 is a plan of the housing including the lever 17, a pair of said springs 22 and also indicates the standpipe 9;

FIGURE 3 is an axial section similar to FIGURE 1 of the housing only, the lever 17, the spring 22, the valve 12 and the standpipe 9 and pipes 25 and 26 having been omitted;

FIGURE 4 is a plan view similar to FIGURE 2 of the housing only, the lever 17, the springs 22, the valve 12 and the standpipe 9 having been omitted; and FIGURE 5 is a plan view of the lever only.

The coupling comprises a housing 1 having a passage 2 extending longitudinally therethrough. One end of the housing 1 has a recess 3 in which one pipe 25 of the pipe-line and indicated by chain-dot lines in FIGURE 1 is to be fitted. The other end of the housing 1 is formed as a socket 4 into which an end of another pipe 26 of the pipe-line, and also indicated by chain-dot lines in FIGURE 1, can be inserted. The socket 4 contains a sealing ring 5 engageable with the pipe 26 inserted in the socket 4, and the upper face of the housing 1 adjacent the socket 4 is formed with a pair of recesses 6 and 7 in one or other of which a hooked arm 27, indicated by chain-dot lines in FIGURE 1 and pivotally carried on a collar 28 attached to the pipe 26 is engageable. A pipe coupling having a socket similar to the socket 4 and a pair of latching recesses 6 and 7 is described in British specification No. 954,957. A similar socket having only one latching recess is described and claimed in British specification No. 732,553.

The housing 1 also includes in its upper wall a socket 8 into which the lower end of the standpipe 9 (indicated in chain-dot lines) is insertable. The socket 8 has a recess therein containing a sealing ring 10 engageable between the wall defining the recess and the pipe 9. The lower end of the socket 8 is formed with an internal annular shoulder 11 forming a seating for a ball valve member 12 which is held in sealing engagement with the seating by fluid pressure within the housing 1. The ball valve member 12 is moved downward into its open position, as illustrated in FIGURE 1, in which liquid within the housing 2 can flow through the seating, by the lower end of the standpipe 9, depressing a wire hanger 14 embedded in the ball valve member. Such a socket has been described in British specification No. 1,025,107.

The present invention is concerned with means for holding the standpipe 9 in the socket 8. The means comprises an upward tubular extension 15 of the socket 8 and a lever 16, 17 pivotally mounted thereon at 18. The lever has two integral portions 16, 17 of unequal length. Each of the portions has a concave edge 19 shaped to embrace a part of the circumference of the pipe 9. (See FIGURE 2.) The internal peripheral surface of the upward tubular extension 15 is formed with a pair of inwardly protruding fixed arcuate extensions 20 diametrically opposite the corresponding edges 19 (see FIGURE 2). When the lever is pivoted to the position illustrated, the edges 19 on the lever portion 16, 17 will be held in engagement with the outer surface of the standpipe 9 and so will push the latter in the socket 8 against the inward extensions 20. The standpipe 9 will thus be gripped at four circumferentially-spaced positions and thus will be held from withdrawal from the socket. The longer portion 17 of the lever is formed at its end remote from the pivot 18 as a pedal 21 which can be depressed by a foot of the operator, thereby to cause the lever to pivot and hence to withdraw the edges 19 from engagement with the standpipe 9 or from a position in which they will prevent insertion of a standpipe into the socket 8. A helical compression spring 22 acts between each of the lever portions 16, 17 and a corresponding boss 29 on the outside of the part of the housing 1, defining the socket 8, to bias the lever into a position in which the edges 19 will engage the standpipe 9, if it has been inserted into the socket, or would engage a standpipe if one had been inserted into the socket. The springs 22 engage respectively the lever portions 16 and 17 at positions nearer to the pivot 18 than is the pedal 21, thereby to provide sufficient leverage at the pedal 21 as to enable the operator to overcome the force of the springs 22 and hence to withdraw the edges 19 from engagement with the standpipe 9. By providing the pedal 21, the operator has both hands free to hold the standpipe, while he inserts it into or removes it from the socket.

When the standpipe 9 has been inserted into the socket 8 and the pedal 21 has been released, the springs 22 will cause the edges 19 to be held in engagement with the periphery of the standpipe and so any tendency of upward movement of the standpipe will be overcome by the radially inward force exerted thereon by the edges 19. By gripping the pipe at the four equally-spaced positions around its periphery, two of which are removable as soon as the pedal 21 has been depressed, the pipe can readily be withdrawn from the socket. The standpipe can be a loose fit in the socket, because sealing is performed by the sealing ring 10, which also assists the edges 19 and the extensions 20 in maintaining the standpipe from wobbling. There is therefore no risk of the standpipe jamming in the socket 8.

If desired, the lever portion 16 may be extended to form a pedal similar to the pedal 21, thereby to enable the operator to pivot the lever by using either of or both his feet.

Another possible modification of the coupling shown in the drawings could be to fit a sleeve on the standpipe at the position of engagement by the edges 19 and the extensions 20, thereby to avoid wear of the standpipe.

What I claim as my invention and desire to secure by Letters Patent of the United States is:

1. A coupling, for connecting a standpipe to a pipe-line, comprising a housing having a flow-path therethrough and inlet and outlet connecting means, whereby the housing is connectable in said pipe-line, an upwardly facing socket in said housing for receiving the lower end of the standpipe, a valve member in said socket controlling flow of fluid from said flow-path into said socket, said valve member being movable from a closed to an open position by engagement of the valve member by the standpipe, when the latter is inserted into said socket, wherein the improvement comprises the provision of a lever pivotally mounted on the housing and having a pair of circumferentially spaced concave surfaces thereon engageable around circumferentially-spaced parts of the circumference of the stand-pipe, when the latter has been inserted into said socket, a pair of circumferentially-spaced, inwardly extending, arcuate extensions on the inner surface of said socket each arranged substantially diametrically opposite one of said concave surfaces on said lever, spring means engaging between said housing and said lever and biasing said lever into a position in which said concave surfaces on the lever engage the standpipe and push the latter transversely of its longitudinal axis into engagement with said concave surfaces of said socket, thereby to grip the standpipe in said socket between four circumferentially-spaced positions around its periphery, a portion of said lever forming a pedal for moving said lever against the bias of said spring means to release said standpipe for removal from said socket and whereby both hands of an operator will be free for inserting the standpipe into and removing it from said socket.

References Cited
UNITED STATES PATENTS

| | | | |
|---|---|---|---|
| 2,152,375 | 3/1939 | Crowley | 285—317 |
| 2,770,474 | 11/1956 | Krapp | 251—149.6 |
| 2,898,128 | 8/1959 | Shohan | 285—6 X |

CARL W. TOMLIN, *Primary Examiner.*

R. G. BERKLEY, *Assistant Examiner.*